United States Patent [19]
Bush et al.

[11] Patent Number: 5,842,339
[45] Date of Patent: Dec. 1, 1998

[54] METHOD FOR MONITORING THE PERFORMANCE OF A CATALYTIC CONVERTER

[75] Inventors: Kevin J. Bush, Northville; Bruce A. Church, Dearborn; David Frankowski, Woodhaven, all of Mich.

[73] Assignee: Motorola Inc., Schaumburg, Ill.

[21] Appl. No.: 806,178

[22] Filed: Feb. 26, 1997

[51] Int. Cl.⁶ .................................................... F01N 3/00
[52] U.S. Cl. ................................ 60/274; 60/276; 60/277; 73/118.1
[58] Field of Search ............................ 60/274, 276, 277; 73/118.1

[56] References Cited

U.S. PATENT DOCUMENTS

| | | | |
|---|---|---|---|
| 4,628,884 | 12/1986 | Geering et al. | |
| 5,228,335 | 7/1993 | Clemmens et al. | 73/118.1 |
| 5,265,417 | 11/1993 | Visser et al. | |
| 5,289,678 | 3/1994 | Grutter | |
| 5,335,538 | 8/1994 | Blischke et al. | 73/118.1 |
| 5,351,484 | 10/1994 | Wade | |
| 5,357,751 | 10/1994 | Orzel | |
| 5,357,753 | 10/1994 | Wade | |
| 5,363,646 | 11/1994 | Orzel et al. | |
| 5,487,269 | 1/1996 | Atanasyan et al. | |
| 5,503,134 | 4/1996 | Delosh et al. | |
| 5,627,757 | 5/1997 | Comignaghi et al. | 60/274 |
| 5,684,248 | 11/1997 | Iwata | 73/118.1 |
| 5,715,678 | 2/1998 | Aronica et al. | 60/276 |

OTHER PUBLICATIONS

"A Review of the Dual EGO Sensor Method for OBD–II Catalyst Efficiency Monitoring," Jeffery S. Hepburn, et al., Ford Motor Co. Fuels & Lubricants Meeting & Expo., Baltimore, Maryland, Oct. 17–20, 1994 SAE Technical Paper Series pp. 1–44 (942057).

"Indirect Adaptive Control of a Three–Way Catlyst," Esfandiar Shafai, et al. Swiss Federal Institute of Technology Society of Automotive Engineers, Inc., Copyright 1996 pp. 185–193 (961038).

"Detection of Catalyst Performance Loss Using On–Board Diagnostics," Clemmens et al., U.S. Environmental Protection Agency; SAE Congress, Detroit, 1990.pp. 1–18.

"Model–Based Fuel Injection Control System for SI Engines," Masahiro Nasu et al. Toyota Motor Corp.; International Spring Fueld & Lubricants Meeting, Dearborn, MI May 6–8, 1996; SAE Technical Paper Series pp.85–95.

"Model Based Air Fuel Ratio Control for Reducing Exhaust Gas Emissions," Akira Ohata, et al., Toyota Motor Corp.; International Congress and Exhibition, Detroit, MI, Feb. 27–Mar. 2, 1995; SAE Technical Paper Series pp. 15–122.

*Primary Examiner*—Thomas E. Denion
*Attorney, Agent, or Firm*—Jasper W. Dockrey

[57] ABSTRACT

A method for monitoring the performance of a catalytic converter (34) computes the oxygen storage capacity and desorption capacity of a catalyst within the catalytic converter (34). An engine control unit (10) receives mass flow rate information of air from a mass air flow rate sensor (12) and an injector driver (24), and receives electrical signals from an upstream exhaust gas sensor (28) and a downstream exhaust gas sensor (30). The engine control unit (10) calculates normalized air fuel ratios for the exhaust gas entering and leaving the catalytic converter (34) and performs numerical integration to determine the oxygen storage capacity and oxygen desorption capacity of the catalyst in the catalytic converter (34). The calculated oxygen storage and desorption capacities of the catalyst are compared with threshold values to determine the performance of the catalytic converter (34).

15 Claims, 11 Drawing Sheets

METHOD FOR MONITORING THE PERFORMANCE OF A CATALYTIC CONVERTER

CROSS-REFERENCE TO RELATED APPLICATIONS

Related subject matter is disclosed in a co-pending, commonly assigned patent application having attorney docket number AP01630 and filed on even date herewith.

FIELD OF THE INVENTION

This invention relates, in general, to exhaust gas control systems and methods of operation, and more particularly, to control systems and methods for monitoring the efficiency of a catalytic converter coupled to an engine.

BACKGROUND OF THE INVENTION

Many environmental pollution laws currently in effect in the United States and many foreign countries, require that exhaust emission reduction equipment in automotive vehicles be continuously monitored by on-board-diagnostic (OBD) systems. The function of the OBD system is to report system failure messages to the vehicle operator when emission control devices no longer meet the mandated emission levels. A key element of exhaust gas emission reduction systems is the catalytic converter, which in current automotive applications is used to simultaneously reduce the levels of carbon monoxide, oxides of nitrogen, and unburnt hydrocarbons in the exhaust.

Several OBD systems presently in use to monitor the performance of the catalytic converter employ a single-valued ratio of the number of voltage level transitions (switches) of two heated-exhaust-gas-oxygen (HEGO) sensors. To monitor the effectiveness of the catalyst, one HEGO is placed in the exhaust gas upstream from the catalytic converter, and the other HEGO is placed in the exhaust gas downstream of the catalytic converter. A controller receives output from the HEGO sensors and determines the number of voltage level transitions of the downstream HEGO relative to the number of voltage level transitions of the upstream HEGO.

The switching ratio of the upstream and downstream HEGO sensors can be used as a crude estimate of the oxygen storage capacity or activity of the catalyst (see, for example, "Detection of Catalyst Performance Loss Using On-Board Diagnostics," W. Clemmens, et al., Society of Automotive Engineers, Detroit Michigan, 1990, paper 900062.). This information is important because oxygen stored on the catalyst provides a source of oxygen for the oxidation of toxic gases in automotive engine exhaust. When the catalyst is no longer able to store sufficient oxygen, the performance of the catalytic converter declines and toxic gases can pass through the exhaust system and into the environment. When the estimated oxygen storage falls below a predetermined level, the controller alerts the operator that exhaust system maintenance is necessary.

Although HEGO sensors are reliable and can function in the high-temperature, corrosive environment of an exhaust gas system, the switch ratio technique has poor resolution and only provides an ability to determine gross changes in the catalyst conversion efficiency. Additionally, the switch ratio technique requires recalibration when there are system changes in the engine or the catalyst.

The limit cycle characteristics employed by the switching ratio technique are affected by changes in control gains and system delays. These effects negatively impact the switch ratio monitors. For example, the frequency and amplitude of the limit cycle can vary depending upon the magnitude of control gains in the engine electronic control system. Variability in the frequency and amplitude of the limit cycle changes the characteristic wave forms from sensors positioned at the input to the catalyst. This distorts the results obtained from catalyst monitors based on comparison of switching frequencies. Additionally, other engine operating variables, such as air flow, temperature, rotational speed, and the like, effect the delay of the engine itself. This delay can alter limit cycle parameters, such as frequency and amplitude, and further reduce the measurement sensitivity and robustness of the switching ratio technique. Accordingly, an improved catalyst performance monitoring method is necessary to satisfy the more stringent exhaust emission controls mandated by current and future air pollution control laws.

DETAILED DESCRIPTION OF PREFERRED EMBODIMENTS

Automotive exhaust gas catalysts have the ability to store (adsorb) and release (desorb) oxygen, carbon monoxide, and hydrocarbon molecules. This storage capability allows the catalyst to absorb short, rapid deviations to rich or lean air/fuel mixtures without loss of conversion efficiency. However, the catalyst has a finite storage capacity for oxygen and exceeding the oxygen saturation level of the catalyst rapidly degrades the catalyst's ability to reduce, for example, various nitrogen oxides. Similarly, the catalyst uses stored oxygen to oxidize carbon monoxide and hydrocarbons, when the air/fuel mixture is temporarily rich. Accordingly, depleting the catalyst of its stored oxygen rapidly reduces the catalyst's ability to, for example, convert carbon monoxide into carbon dioxide.

The present invention is for a method of monitoring the performance of a catalytic converter, in which the amount of oxygen that can be stored by the catalyst within the catalytic converter is calculated based on information received from upstream and downstream exhaust gas sensors, as well as the mass flow rate of air into the engine. The oxygen storage capacity of the catalyst is determined by integrating an expression for the mass flow rate of excess oxygen over a time interval. The limits of integration are determined based on the detection of unreduced oxygen (lean breakthrough) or unoxidized rich gases (rich breakthrough). A rich or lean breakthrough is detected by a comparison of the state of downstream exhaust gas sensor with the state of the upstream and downstream exhaust gas sensor at a previous point in time. The method of the invention computes both the amount of oxygen absorbed onto the catalyst and the amount of oxygen released by the catalyst for a defined time interval. The amount of oxygen absorbed and desorbed from the catalyst can be advantageously employed in a variety of control systems for determining the operational state of the catalyst, and for providing an operator with real-time performance indicators of the catalytic converter.

Figure 1:
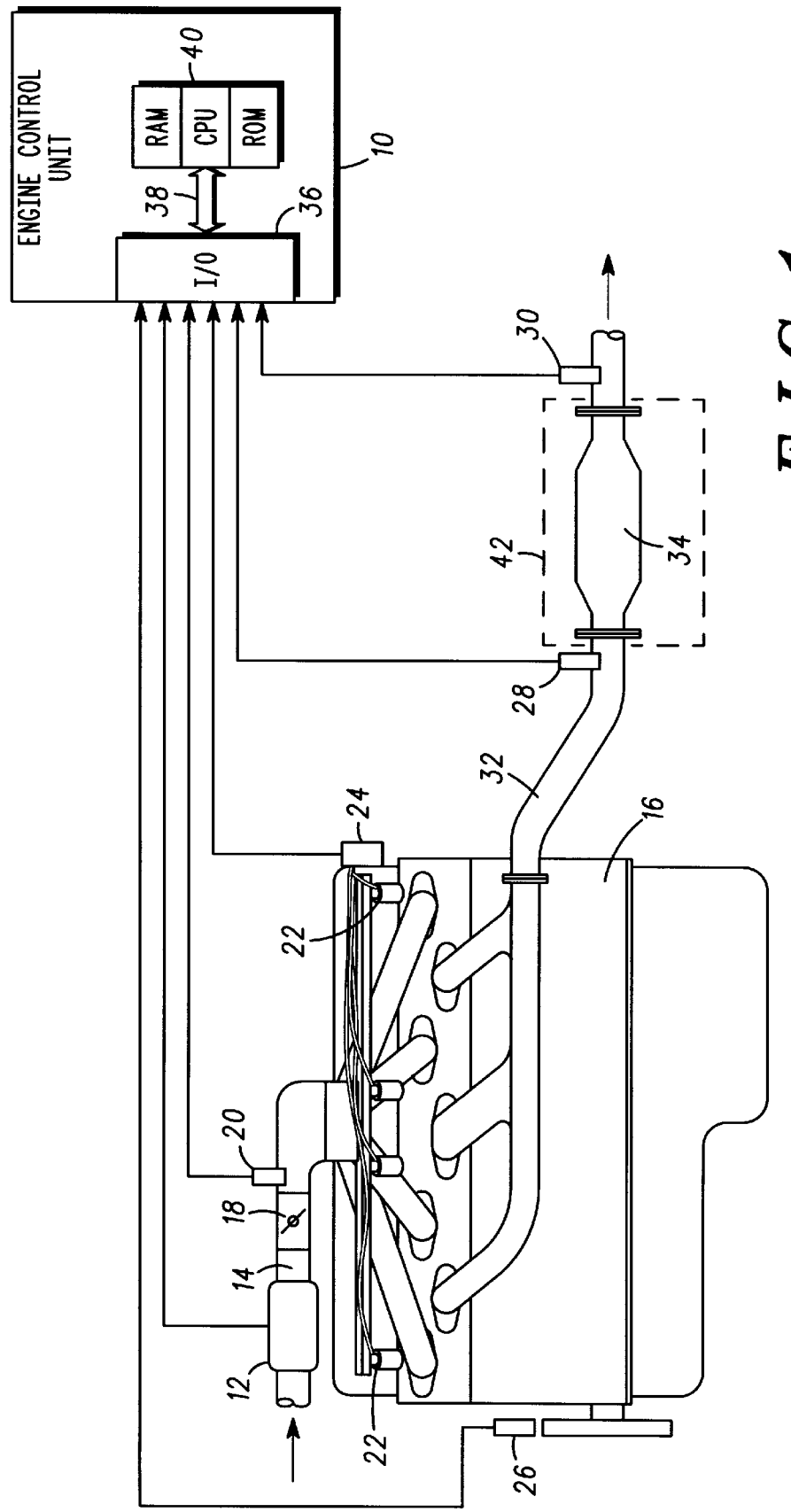
FIG. 1 is a schematic diagram of a catalyst monitoring system arranged in accordance with the invention.

Shown in FIG. 1 is a schematic diagram of an internal combustion engine and an engine control unit configured in accordance with the invention. An engine control unit 10 receives air flow rate information from an mass air flow (MAF) sensor 12 positioned within an intake manifold 14 coupled to an engine 16. A throttle 18 and an absolute pressure sensor 20 are mounted within intake manifold 14. Air entering intake manifold 14 flows to engine 16 past fuel injectors 22. An injector driver 24 is electrically coupled to engine control unit 10. Crank shaft position and engine speed information are relayed to engine control unit 10 by an engine sensor 26. An upstream exhaust gas sensor 28 and a downstream exhaust gas sensor 30 are mounted within an exhaust system 32. Exhaust gas system 32 includes a catalytic converter 34 positioned intermediate to upstream and downstream gas sensors 28 and 30, respectively.

Engine control unit 10 receives and transmits electrical signals through an I/O port 36. I/O port 36 is electrically coupled to control circuitry and storage registers by a data bus 38. All data storage, signal modulation, and computational procedures performed by the present invention are carried out by engine control unit 10 utilizing conventional circuit elements, such as a central processing unit, random access memory registers, read only memory registers, and the like. These elements are generally depicted as element 40 within engine control unit 10.

The computational approach for the catalyst monitoring method of the invention defines a control volume 42 around the catalyst and monitors the flow of exhaust gases into and out of catalytic converter 34. An estimate of the mass flow rate of oxygen into the control volume 42 can be determined for steady state conditions from measurements of the air mass flow rate and the excess air ratio according to equation (1), $$\dot{m}_{O_2,inlet} = C(\dot{m}_{air})[(\lambda_{inlet}-1)/\lambda_{inlet}] \qquad (1)$$

where $\dot{m}_{O_2,inlet}$ is the mass flow rate of excess oxygen, $\dot{m}_{air}$ is the air mass flow rate, $\lambda_{inlet}$ is the normalized exhaust air/fuel mass ratio, and C is a constant representing the approximate mass fraction of oxygen in air (C=0.23). The excess air ratio $\lambda$ is the ratio of the actual air/fuel ratio to the stoichiometric air/fuel ratio, $\lambda=[A/F_{actual}/A/F_S]$, where $A/F_{actual}$ is the air/fuel mass ratio in the feed gas from the engine or in the exhaust gas stream and $A/F_S$ is the stoichiometric mass ratio of air to fuel. Equation (1) can be simplified by converting $\lambda$ to the fuel/air equivalence ratio $\Phi$ according to equation (2).

$$\Phi = 1/\lambda \qquad (2)$$

Upon substituting equation (2) into equation (1) and rearranging, a simplified expression for the excess oxygen mass flow rate can be expressed as equation (3), $$\dot{m}_{O_2} = C(\dot{m}_{air})(1-\Phi_{inlet}) \qquad (3)$$

where $\Phi_{inlet}$ is the fuel/air equivalence ratio of exhaust gases upstream from the catalytic converter.

A similar expression to equation (3) can be used for the flow rate of oxygen at the outlet of control volume 42. From the principle of conservation of mass, in a steady state steady flow, the rate of storage of oxygen in the control volume is equal to the difference between the inlet flow rate and the outlet flow rate. For the usual case when the active catalyst is able to store or release oxygen at a rate fast enough to nearly completely oxidize or reduce the inlet gases, the flow rate of excess oxygen at the outlet of the control volume can be neglected. For this case, the rate of oxygen storage in the control volume can be simplified to equation (3).

If it is assumed that the catalyst is a near-perfect oxygen storage device, the amount of stored oxygen can be obtained by integrating the flow rate of oxygen into the catalyst from a depleted point to a saturated point. To determine the amount of oxygen stored in the catalyst $\dot{m}_{O_2}$, equation (3) can be integrated over a time interval as expressed by equation (4), $$\overline{m}_{O_2} = C \int_a^b \left[ \overset{*}{m}_{air}(\tau) \right] [1-\Phi_{inlet}(\tau)] d\tau \qquad (4)$$

where "a" and "b" are limits of integration and C is a time integration variable. Integration limits "a" and "b" specify various points in time related to complete saturation of the catalyst surface with oxygen, and to complete depletion of oxygen from the catalyst surface.

In accordance with the present invention, the integration limits "a" and "b" are correlated with changes in the oxygen concentration of the exhaust gas flowing at the inlet and the outlet of catalytic converter 34. To perform the computation, engine control unit 10 specifies integration limits "a" and "b" by analyzing electrical signals from upstream and downstream gas sensors 28 and 30. Upstream and downstream gas sensors 28 and 30 output electrical signals that are used by engine control unit 10 to compute a numerical value for $\lambda$ at both the upstream and downstream locations in exhaust system 32. Engine control unit 10 computes $\lambda$ values for exhaust gas entering and exiting control volume 42.

For purposes of definition, as used herein, a value of $\lambda$ less than one indicates a rich condition indicating the exhaust gas contains a high fuel concentration. Correspondingly, for values of $\lambda$ greater than one, a lean condition occurs indicating the exhaust gas contains a low fuel concentration and a high oxygen concentration. Furthermore, the present invention will be described in terms of a breakthrough event. A lean breakthrough is defined as a change in the $\lambda$ value of downstream gas sensor 30 from a rich condition to a lean condition. Alternatively, a rich breakthrough occurs where downstream gas sensor 30 switches from a lean condition to a rich condition.

Those skilled in the art will appreciate that the computation of $\lambda$ can be carried out by engine control unit 10 upon receiving input from various kinds of exhaust gas sensors. For example, a universal exhaust gas oxygen (UEGO) sensor can be used in which a proportional voltage signal is output depending upon the oxygen concentration in the sensed exhaust gas stream. Alternatively, a heated exhaust gas oxygen (HEGO) sensor or an exhaust gas oxygen (EGO) sensor can be used in the downstream position. In the case of a HEGO or EGO sensor, a rich breakthrough may be inferred on a change in the state of the signal from lean to rich, and a lean breakthrough may be inferred on a change in the state of the signal from rich to lean.

Referring again to equation (4), mass air flow rate $\dot{m}_{air}$ is provided by MAF sensor 12, which in a preferred embodiment is a hot wire mass air flow rate sensor. For non-steady state conditions, it is common practice to compute the air flow rate into the engine by determining the manifold pressurization or depressurization using a manifold mathematical model. This determination is then factored into the air flow rate measured by MAF sensor 12. A value for $\Phi$ is calculated by engine control unit 10 from the output of upstream gas sensor 28.

Those skilled in the art will appreciate that another standard practice for calculating the air flow rate into the engine $\dot{m}_{air}$ is based on intake manifold pressure (MAP), air temperature and engine speed (RPM) measurements. In this approach, the air flow rate of the engine $\dot{m}_{air}$ is a tabulated function of manifold pressure, engine speed, and air temperature (ACT). Table look-up and interpolation methods are used to calculate the air flow rate.

Integration limits "a" and "b" can be determined by specifying a threshold value for $\lambda$, for example as previously described a value of 1.0, as signifying a state transition. Accordingly, a lean breakthrough, indicating that the oxygen storage capacity of the catalyst has been exceeded, can be defined as the point where the $\lambda$ value of downstream gas sensor 30 switches from less than one to greater than one. Conversely, a rich breakthrough can be detected when gas sensor 30 switches to a $\lambda$ value of less than one. From the foregoing, it should be apparent that the start of a lean breakthrough could be used to detect saturation of the catalyst surface with oxygen, and the start of a rich breakthrough could be used to detect that the catalyst surface has been depleted of oxygen.

Those skilled in the art will also appreciate that the same definitions of rich and lean apply to output by upstream gas sensor 28, and can be used to determine the rich or lean condition of exhaust gas flowing into control volume 42. By monitoring $\lambda$ values for both upstream gas sensor 28 and downstream gas sensor 30, the time at which a breakthrough occurs can be approximately determined when taking into consideration the delay time of exhaust gas in catalytic converter 34. For example, an estimate for the oxygen storage capacity of the catalyst can be made if the integral of equation (4) is accumulated from a time at which the catalyst is depleted of oxygen ($t_{depletion}$), to a time at which the catalyst is saturated with oxygen ($t_{saturated}$). The lower integration limit "a" corresponds to a point in time where a transition from a rich feed gas to a lean feed gas is detected by upstream gas sensor 28 after the catalyst has been depleted of oxygen (after a sufficient rich gas flow to totally deplete the catalyst surface of oxygen). Correspondingly, the upper integration limit "b" represents a point in time where the catalyst is saturated with oxygen. This point in time is detected when downstream gas sensor 30 indicates a lean breakthrough ($\lambda$ greater than 1).

It is important to note that the limits of integration in equation (4) can be inverted and the integral accumulated from a time of oxygen saturation to a time of oxygen depletion and taking the negative of the result to produce an identical value. In some cases, the inverted integral may provide a more accurate and repeatable estimate of oxygen storage and release capacity.

Those skilled in the art will appreciate that the oxygen release or desorption capacity of the catalyst can be determined in an analogous manner to that of the oxygen storage capacity. In addition, those skilled in the art will recognize that many numerical techniques exist for computing values of finite integrals, such as the integral of equation (4). In a preferred embodiment of the invention, a trapezoidal algorithm is used to compute the integral of equation (4), however another numerical integration technique, such as Newton's finite difference, and the like, can also be used. In the preferred embodiment of the invention, the computational method employs a trapezoidal algorithm in which the integral of equation (4) is expressed as equation (5), $$\bar{m}_{O_2}(k) = \bar{m}_{O_2}(k-1) + [\dot{m}_{O_2}(k) + \dot{m}_{O_2}(k-1)]T:2 \quad (5)$$

where k is an iteration counter, and T is the time period between values calculated at time (k−1) and time (k).

Figure 2:
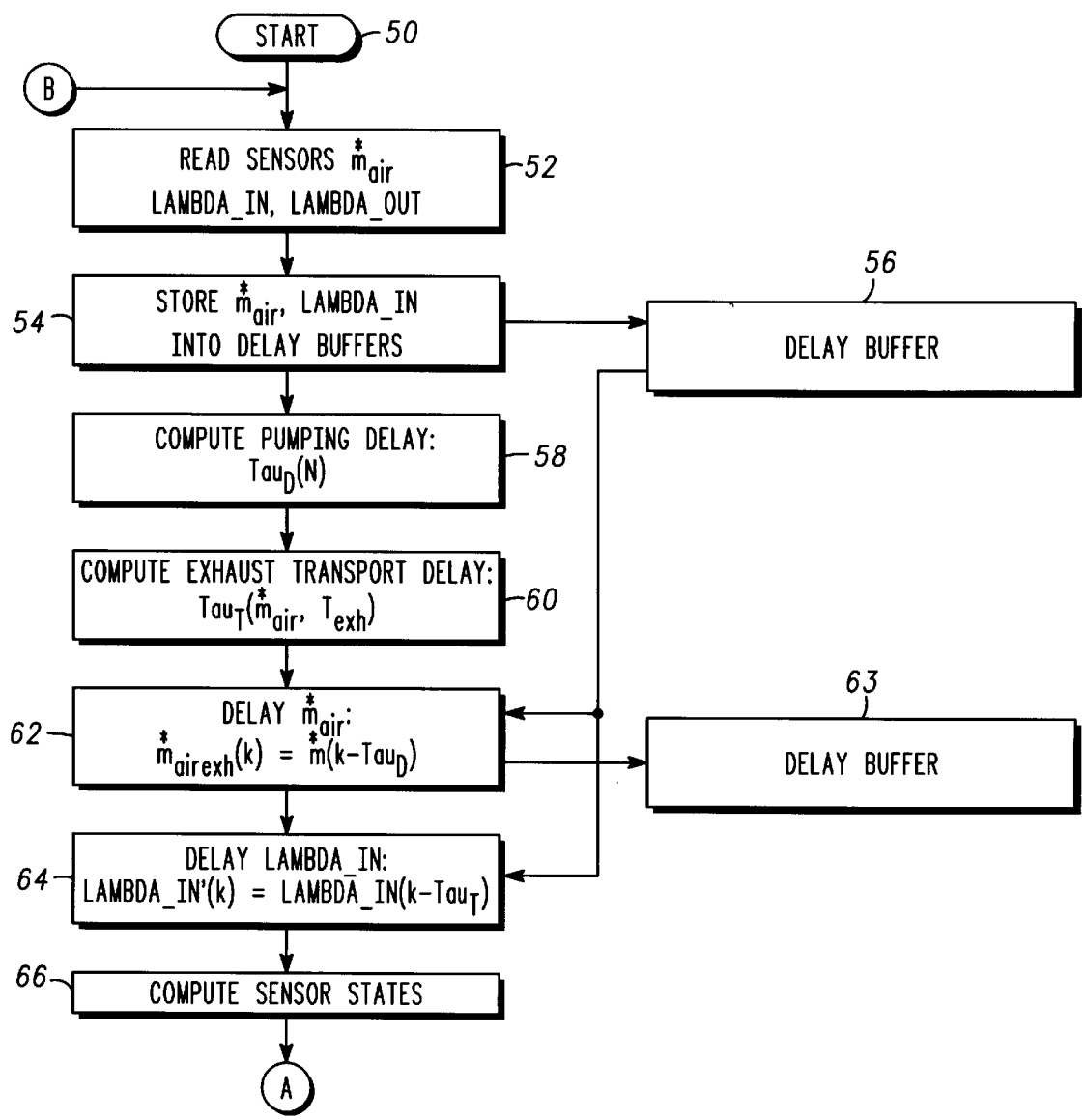
FIGS. 2 and 3 illustrate a flow diagram for oxygen storage measurement in accordance with the invention.
Figure 3:
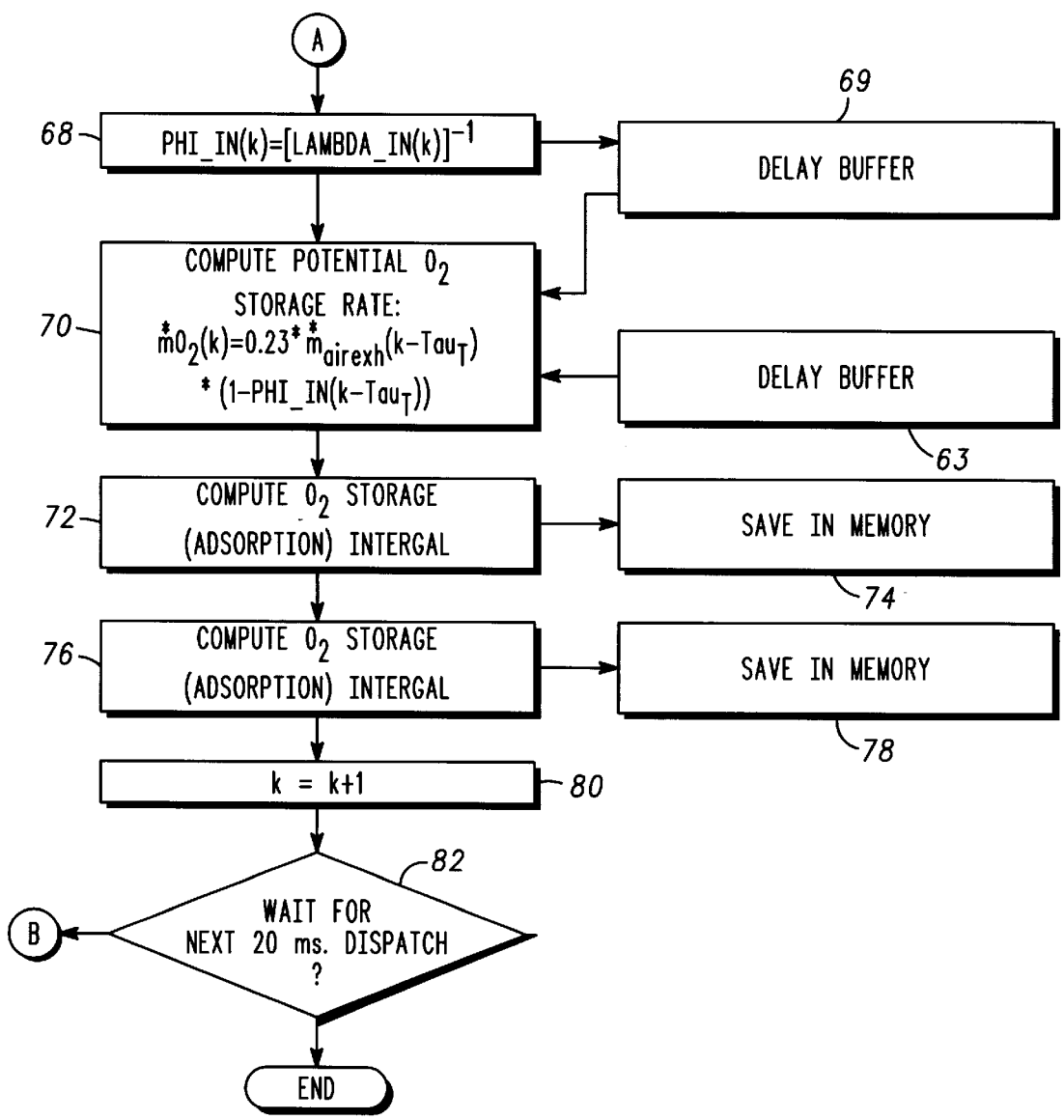

The method of the invention will now be described with reference to FIGS. 2–8. FIGS. 2–8 illustrate a flow chart of a computational algorithm carried out in accordance with one embodiment of the invention. The Main Program routine for computation and storage of information concerning the oxygen adsorption capacity and oxygen desorption capacity is shown in FIGS. 2 and 3. Counters k, m and n are initialized at step 50 and sensor readings for mass air flow from MAF sensor 12 and $\lambda$ values from upstream and downstream sensors 28 and 30 are read at step 52. At step 54, values for $\lambda_{inlet}$ inlet and $\dot{m}_{air}$ are stored in buffers 56.

Those skilled in the art will appreciate that computation of gas hold-up delays in engine 16 and exhaust sytem 32 are necessary for an accuate determination of exhaust gas residence time in catalytic converter 24. Accordingly, pumping delay time $\tau_d$ and exhaust system transport delays $\tau_t$ are computed at step 58 and step 60, respectively. The delayed values for $\dot{m}_{air}$ is computed at step 62 and stored in memory register 63. The delayed value for $\lambda_{inlet}$ is computed at step 64, after reading indexed values for $\dot{m}_{air}$ and $\lambda_{inlet}$ from buffer 56. The switching states of upstream and downstream gas sensors 28 and 30 are determined at step 66 using the Sensor States subprogram shown in FIG. 4.

Referring to FIG. 3, the main computational routine continues with the computation of the value for $\Phi_{inlet}$ at step 68. The $\Phi_{inlet}$ value for the current iteration (k) is stored in delay buffer 69. At step 70, information from delay buffers 63 and 69 are read and a value for the oxygen mass flow for the current iteration is computed. Once a value for the oxygen mass flow rate is available, the amount of oxygen stored in the catalyst is computed at step 72 using the Oxygen Storage Integral subprogram shown in FIGS. 5 and 6. The computed value returned by the subprogram for the oxygen stored by the catalyst is placed in memory register 74. Next, the oxygen released by the catalyst is computed at step 76 using the Oxygen Release Integral subprogram shown in FIGS. 7 and 8. The value returned by the subprogram for the amount of oxygen released is placed in a memory register 78. Finally, time counter k is advanced by one at step 80 and program control transfers to step 82 and awaits prompting by the CPU to return program control to step 52, where another computational sequence begins. To assist in comprehending the analysis performed by the present invention reference is made to Table I of the APPENDIX. The logic relationships used by the subprograms shown in FIGS. 4, 5, 6, and 8 to determine breakthroughs and specify integrator commands are shown in Table I of the APPENDIX.

Figure 4:
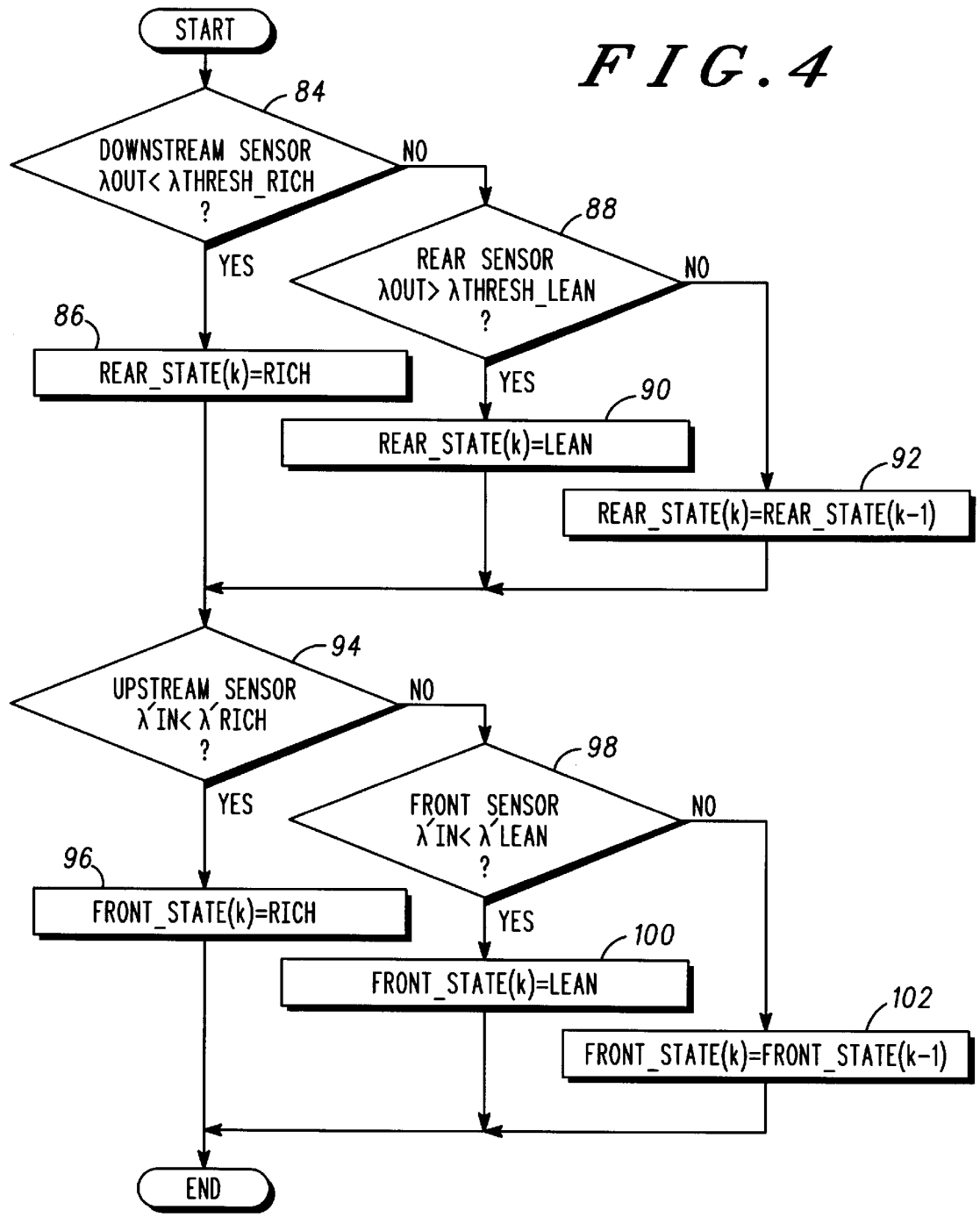
FIG. 4 illustrates a flow diagram for computation of gas sensor states in accordance with the invention.

Referring to the Sensor States subprogram shown in FIG. 4, upon receiving program control from step 66, the $\lambda$ value computed from the output of downstream sensor 30 is compared with a threshold value at step 84. If the $\lambda$ value is less than the threshold, then the state of the downstream sensor is set to rich at step 86. Alternatively, if the $\lambda$ value is not less than a predetermined threshold, then the $\lambda$ value is compared with a lean threshold at step 88. If the $\lambda$ value of downstream gas sensor 30 is greater than the lean threshold, then the state of the sensor is set to lean at step 90. Alternatively, if the λ value is not greater than the lean threshold, the present state of downstream gas sensor 30 (at time index k) is set equal to the state at the previous iteration (k−1) at step 92.

Once the state of downstream gas sensor 30 is specified, the λ value of upstream gas sensor 28 is compared with a rich threshold specification at step 94. If the λ value of upstream gas sensor 28 is less than the rich threshold specification, the state of upstream gas sensor 28 is set to rich at step 96. Alternatively, if the λ value of upstream gas sensor 28 is not less than lambda rich, then the lambda value is compared with a lean threshold at step 98. If the λ value of upstream gas sensor 28 is greater than the lean threshold upstream gas sensor 28 is set to lean at step 100. If the λ value of upstream gas sensor 28 is not greater than the lean threshold, the state of upstream gas sensor 28 in the present iteration (k) is set equal to the value of the previous iteration (k−1) at step 102. Program control then transfers back to step 66 in the Main Program.

Figure 5:
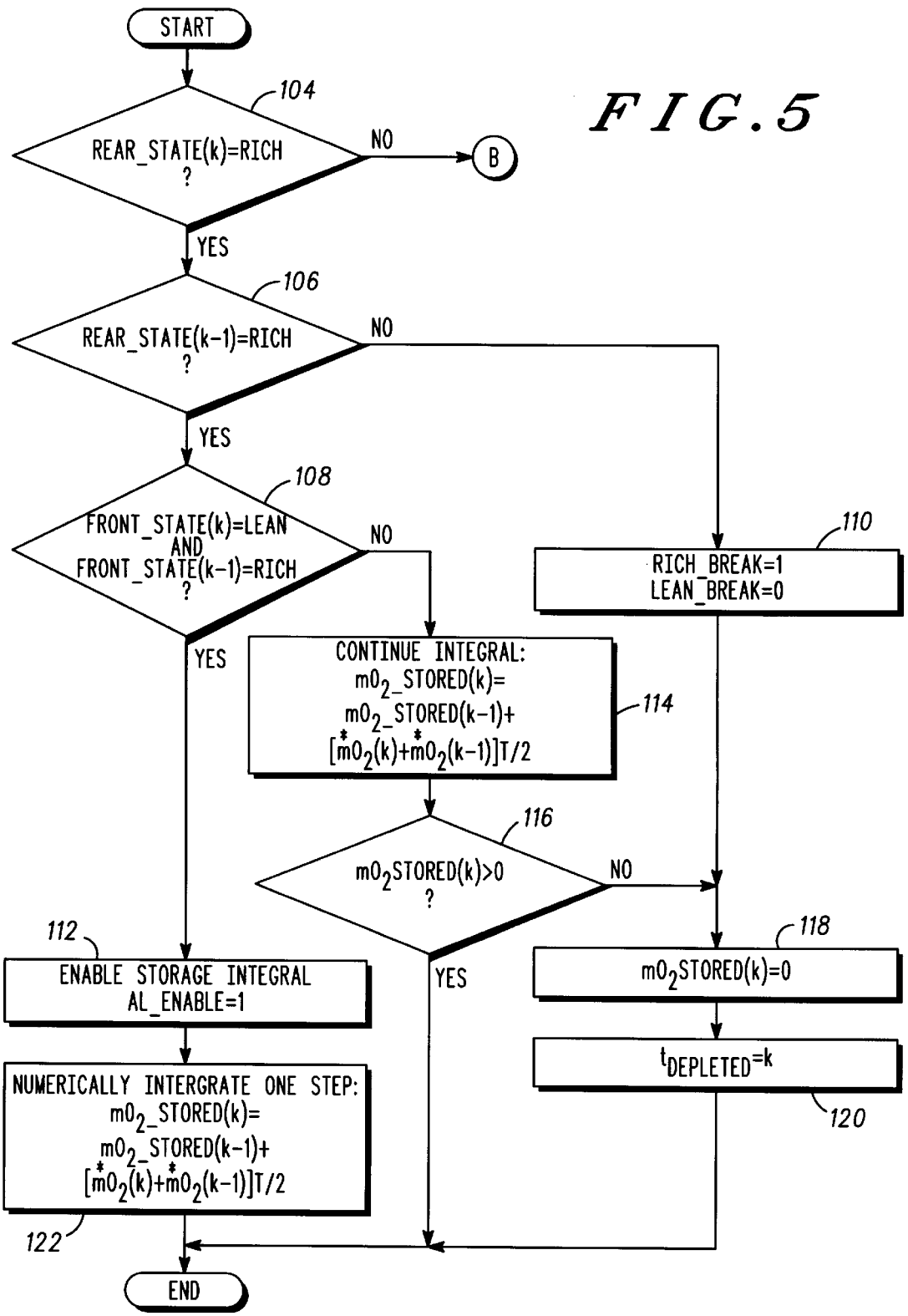
FIGS. 5 and 6 illustrate a flow diagram for computation of oxygen storage by a catalyst in accordance with the invention.
Figure 6:
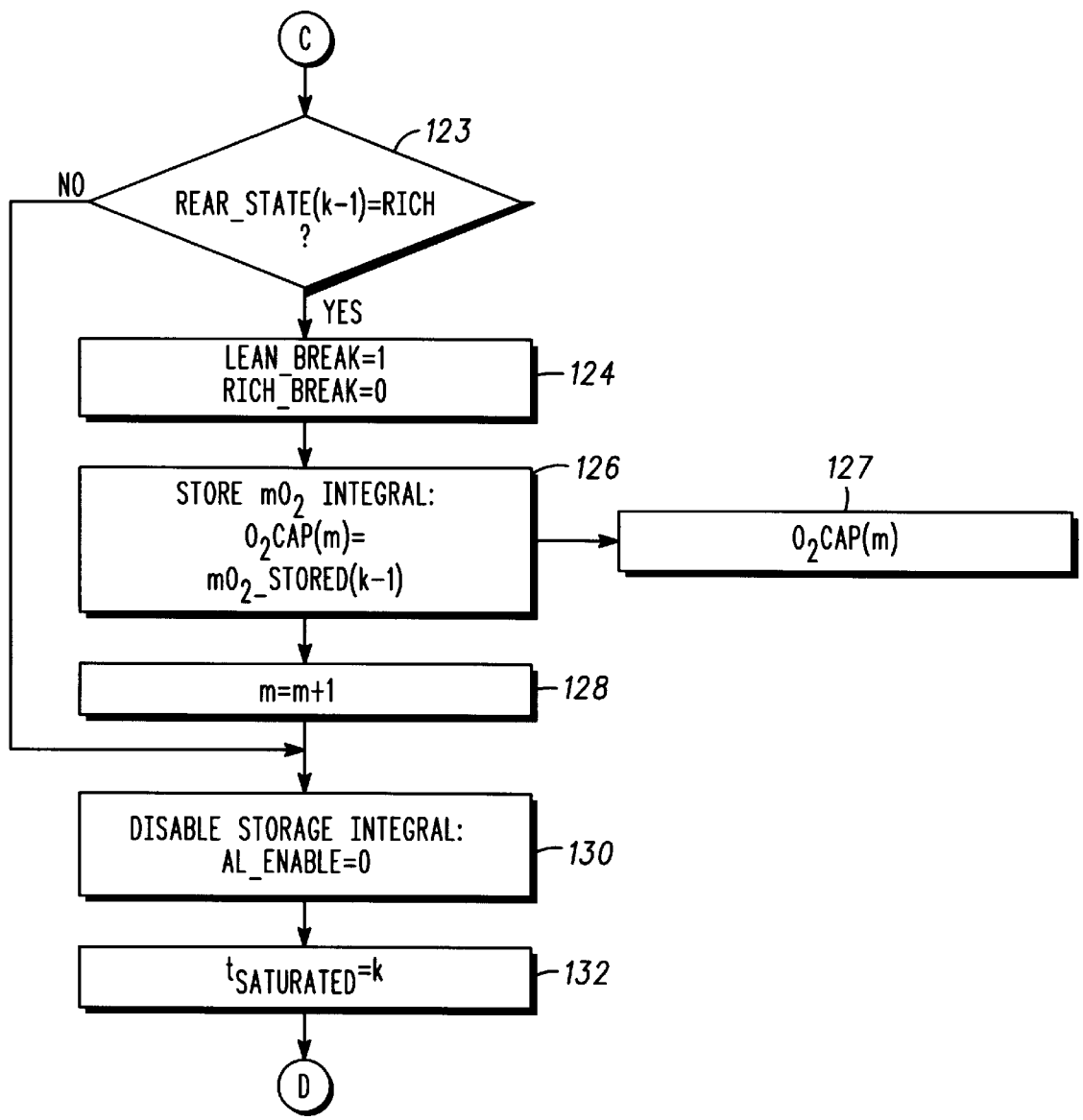

The Oxygen Storage Integral subprogram for the computation of absorbed oxygen by the catalyst is illustrated in FIGS. 5 and 6. The state of downstream gas sensor 30 for both the present iteration (k) and the previous iteration (k−1) is examined at step 104 and step 106. If the present state of the sensor is rich, program control transfers to step 106, where program control is transferred to step 108 if the prior state (k−1) was rich. If the status of downstream sensor 30 at the present iteration (k) is not rich, programming control is transferred to step 123 (shown in FIG. 6). If the previous state (k−1) of downstream gas sensor 30 was not rich, then the status of a rich breakthrough is set to one and a lean breakthrough is set to zero at step 110. If the present status of upstream gas sensor 28 is lean and the previous status (k−1) of upstream gas sensor was rich, then storage integral enabled AI is set to one at step 112. Conversely, if the state of upstream gas sensor 28 is not lean in the present iteration, and was not rich in the previous iteration (k−1), then the current value for the oxygen stored by the catalyst is computed at step 114 using equation (5).

The computed value for stored oxygen for the present iteration (k) is compared with zero at step 116. If the computed mass of oxygen is greater than zero, programming control shifts back to the Main Program at step 72. Alternatively, if the computed mass of oxygen is zero, or some negative value, then the stored value is set to zero at step 118, and the current iteration (k) is identified as a time of oxygen depletion of the catalyst ($t_{depletion}$) at step 120 and program control returns to step 72. If the current status of upstream gas sensor 28 is lean and the prior status (k−1) was rich, then the mass of oxygen is computed at step 122, and program control returns to step 72 in the Main Program.

If the state of downstream gas sensor 30 is not equal to rich in the present iteration (k), then programming control is transferred to step 123, shown in FIG. 6. If the state of downstream gas sensor 30 at the previous iteration (k−1) was rich, then a lean breakthrough condition is set equal to one and a rich breakthrough condition is set equal to zero at step 124. Next, the oxygen capacity of the catalyst for the present evaluation (index m) is set equal to the value computed in the previous iteration (k−1) at step 126.

The measurement index m is updated by one at step 128 and the storage integral enable flag AI is disabled by setting value equal to zero at step 130. Also, if the state of downstream gas sensor 30 was set to rich at the previous iteration (k−1), then program control transfers directly from step 123 to step 130. The present iteration (k) is then identified as a saturated condition ($t_{saturated}$) at step 132, and program control returns to step 72 in the Main Program.

Figure 7:
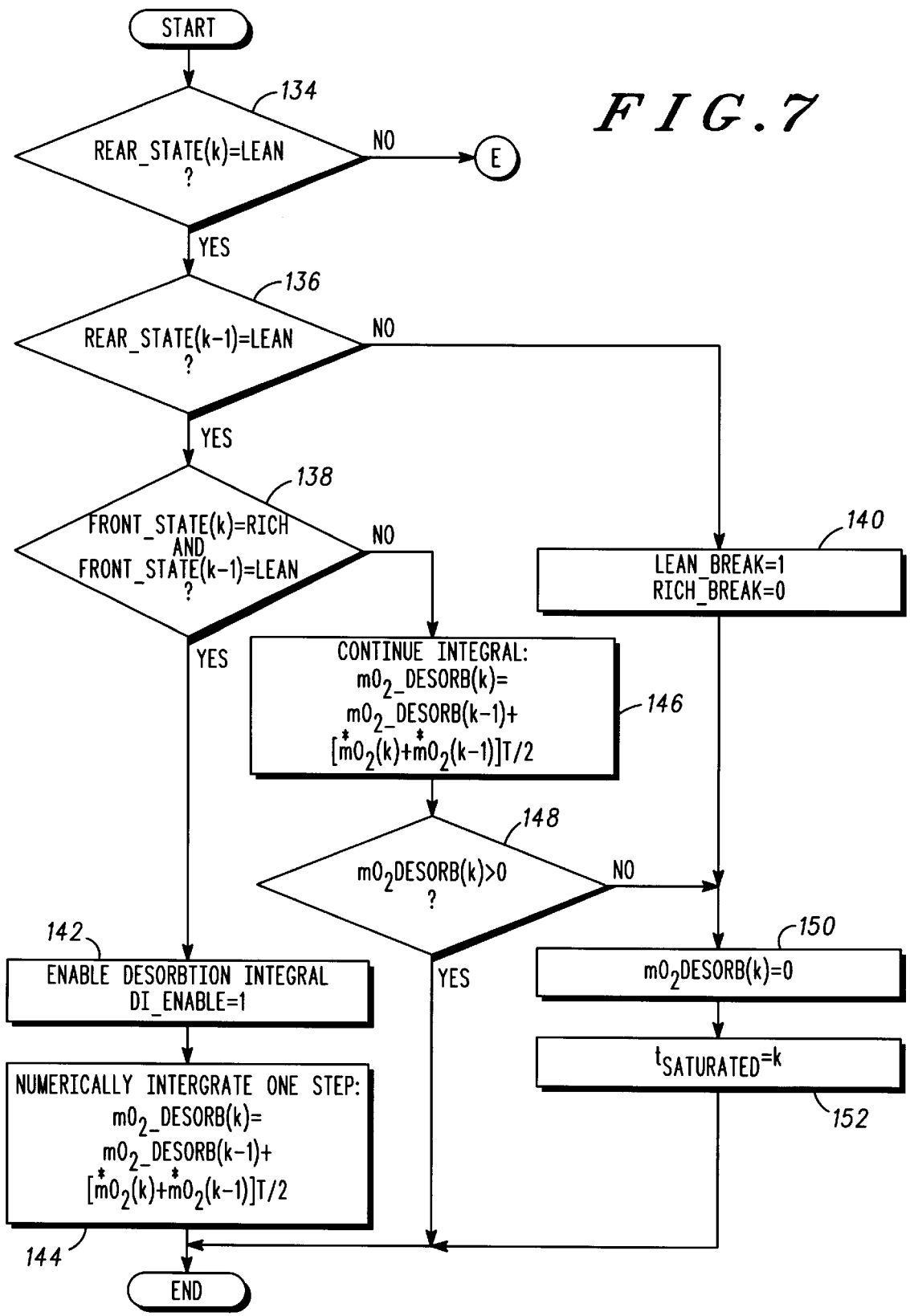
FIGS. 7 and 8 illustrate a flow diagram for computation of oxygen release by a catalyst in accordance with the invention.
Figure 8:
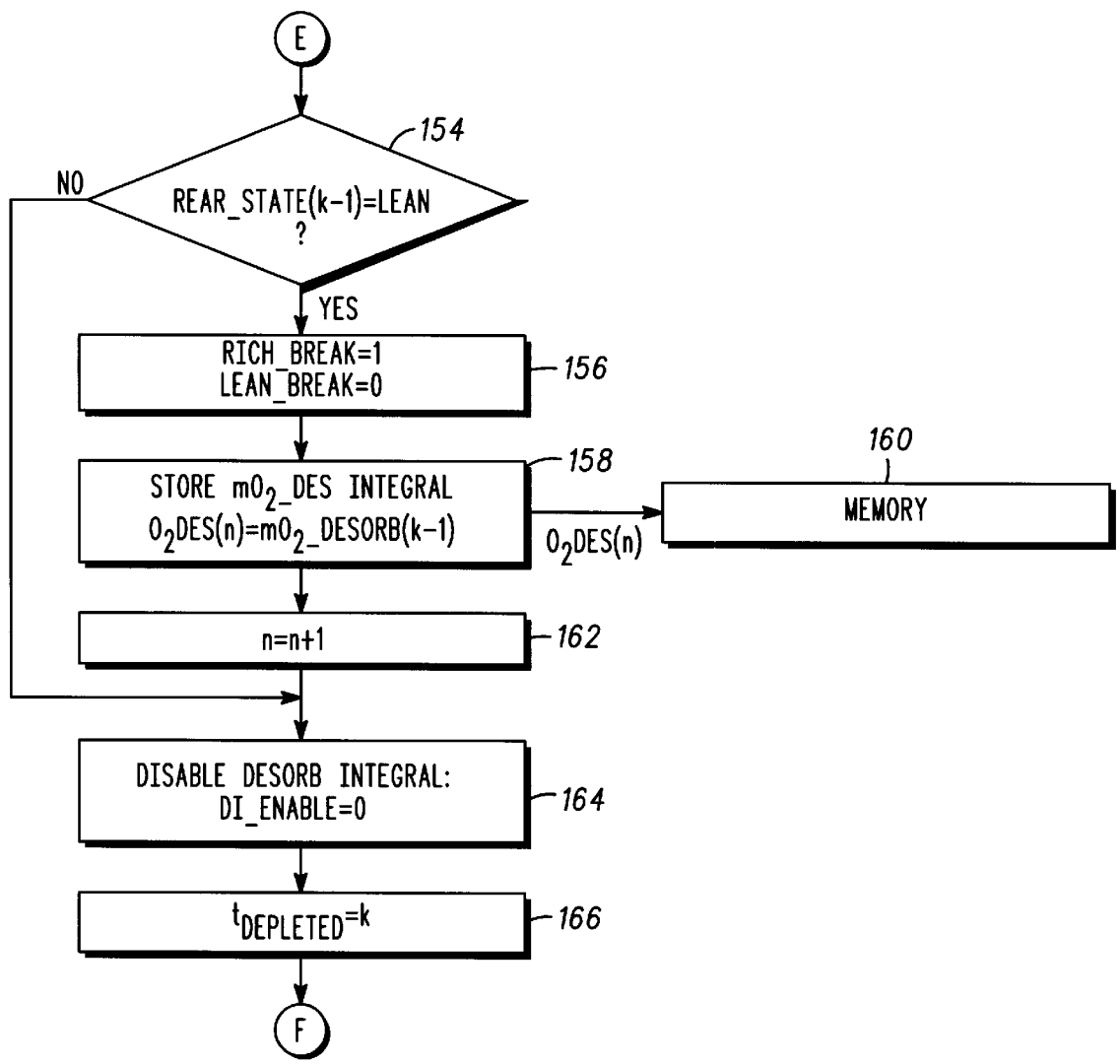

The Oxygen Release Integral subprogram to compute the amount of oxygen released or desorbed from the catalyst is illustrated in FIGS. 7 and 8. The general computational approach is substantially similar to that illustrated for the Oxygen Storage Integral subprogram used to compute the amount of oxygen stored or absorbed by the catalyst. However, the computational method for determining the desorption of oxygen examines the sensor status for the opposite conditions as compared to the analysis for the absorption of oxygen by the catalyst. Accordingly, if the present state of downstream oxygen sensor 30 is lean, and the previous state (k−1) was lean, then the status of upstream gas sensor 28 is analyzed at step 138. Conversely, if the status of the downstream gas sensor 30 in the prior iteration (k−1) was not lean, then a lean breakthrough is set equal to one, and a rich breakthrough is set equal to zero at step 140. If the analysis carried out at step 138 is true and the present state of upstream gas sensor 28 is rich, and the previous state (k−1) of upstream gas sensor 28 was lean, then the desorption integral enable DI is set equal to one at step 142. Program control is then transferred to step 144, where numerical integration is carried out using only the value for the mass of oxygen stored in the catalyst at the present iteration (k).

Where the status test carried out at step 138 is negative, the amount of the desorbed oxygen is determined by the numerical integration carried out at step 146. If the computed value for the mass of oxygen stored is equal to zero program control is transferred by step 148 to step 150, where the mass of desorbed oxygen is set equal to zero. Then, the present iteration is identified as a saturated condition ($t_{saturated}$) at step 152 and program control returns to step 76 in the Main Program (shown in FIG. 2).

Where the state of downstream gas sensor 30 in the present integration (k) is not lean, then program control shifts to step 154, shown in FIG. 8. If the prior state (k−1) of downstream gas sensor 30 was set equal to lean, then a rich breakthrough condition is set equal to one and a lean breakthrough condition is set equal to zero at step 156. Next, the desorption capacity at measurement index (n) (as indicated by the value of the integral for the total amount of desorbed oxygen) is set equal to the integrated mass of oxygen desorbed at the previous step (k−1) at step 158, and the value is stored in memory location 160. Then, the iteration counter (n) is incremented by one at step 162 and the desorption enable DI is disabled by setting the value equal to zero at step 164. The status of the present iteration is set as a time depleted condition ($t_{depleted}$) at step 166 and program control returns to step 76 in the Main Program.

The values for the oxygen capacity determined at step 126 and stored in memory location 127 can be compared with a reference standard or threshold value to determine the condition of the catalyst in catalytic converter 34. For example, if the oxygen storage capacity of the catalyst deteriorates below a predetermined threshold value, the catalyst is no longer able to provide enough oxygen to oxidize toxic components of the exhaust gas. When the calculated oxygen storage capacity falls below a predetermined threshold level, a signal can be sent to the operator to notify the operator that catalytic converter 34 requires service. Correspondingly, the oxygen desorption quantity determined at step 158 and stored at memory 160 provides another measure of catalyst performance. To effectively convert toxic components within the exhaust gas, the catalyst must be able to desorb a sufficient quantity of oxygen. When the amount of oxygen absorbed from the catalyst falls below a predetermined threshold, a signal is sent to the operator to notify the operator that service of catalytic converter 34 is necessary.

Those skilled in the art will recognize that the computational procedure described above can also be carried out using the mass flow rate of fuel into the engine, rather than the mass flow rate of air. The mass flow rate of oxygen in the exhaust can be determined according to equation (6), $$\dot{m}_{O_2} = C(\dot{m}_{fuel})(\lambda_{inlet} - 1) \qquad (6)$$

where $\dot{m}_{fuel}$ is the mass flow rate of fuel into engine 16 through injectors 22.

The mass flow rate of fuel, in grams per second, for a single injector per cylinder, sequentially-fueled engine can be determined from the injector pulse width as shown by equation (7), $$\dot{m}_{fuel} = \text{(injector pulse width)(injector flow specification)(number of cylinders)(RPM/2)(1/60)} \qquad (7)$$

where RPM is the rotational speed in revolutions per minute of engine 16 as determined by engine sensor 26. Those skilled in the art will recognize that equation (6) can be a direct substitute for equation (1) and can be integrated over predetermined time intervals to give the storage capacity and the desorption capacity of oxygen in catalytic converter 34. This computation can be performed in a manner analogous to that described by equation (4) using the mass air flow.

Figure 9:
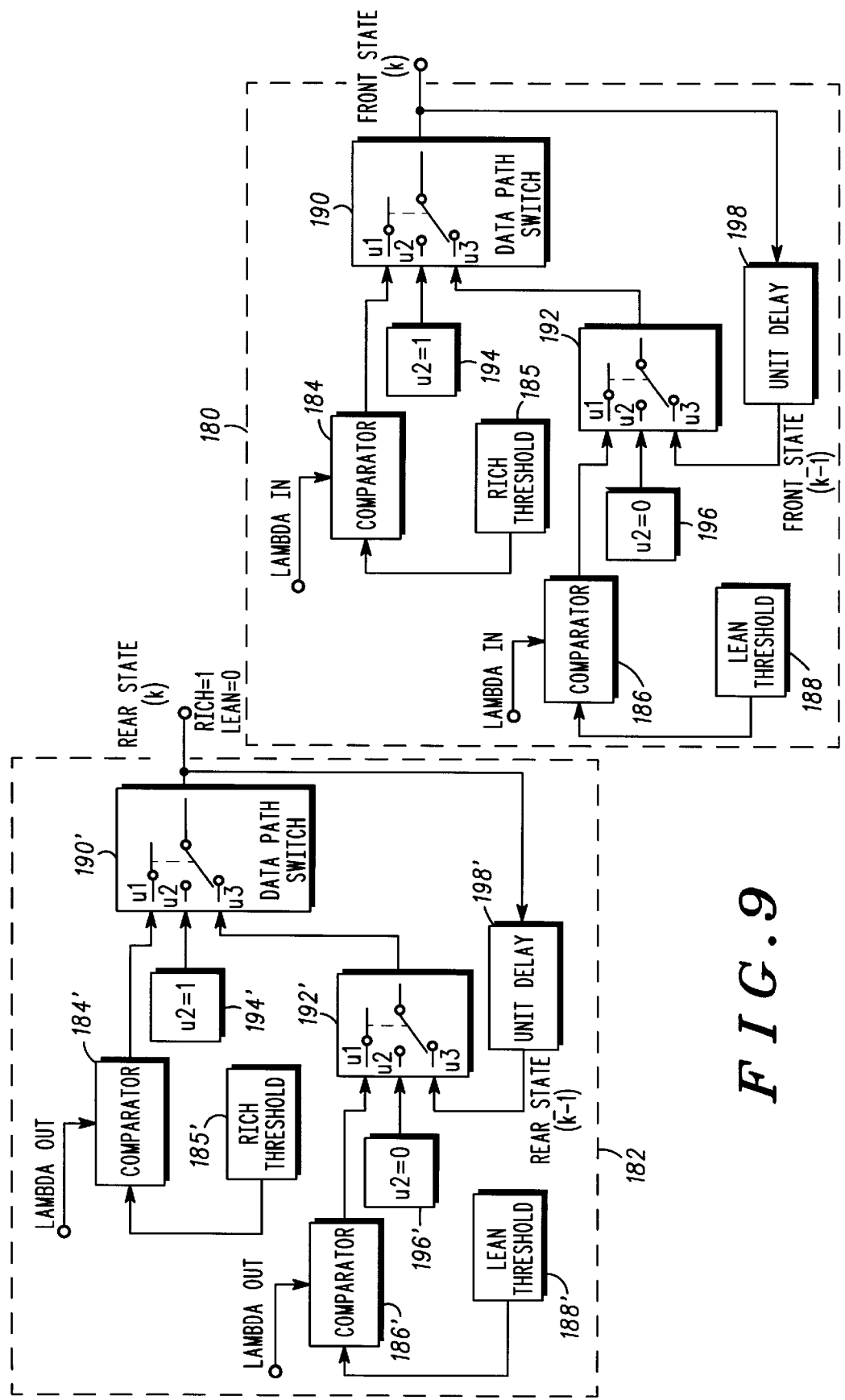
FIG. 9 is a signal processing schematic diagram in accordance with an exemplary embodiment of the invention for the determination of sensor states.
Figure 10:
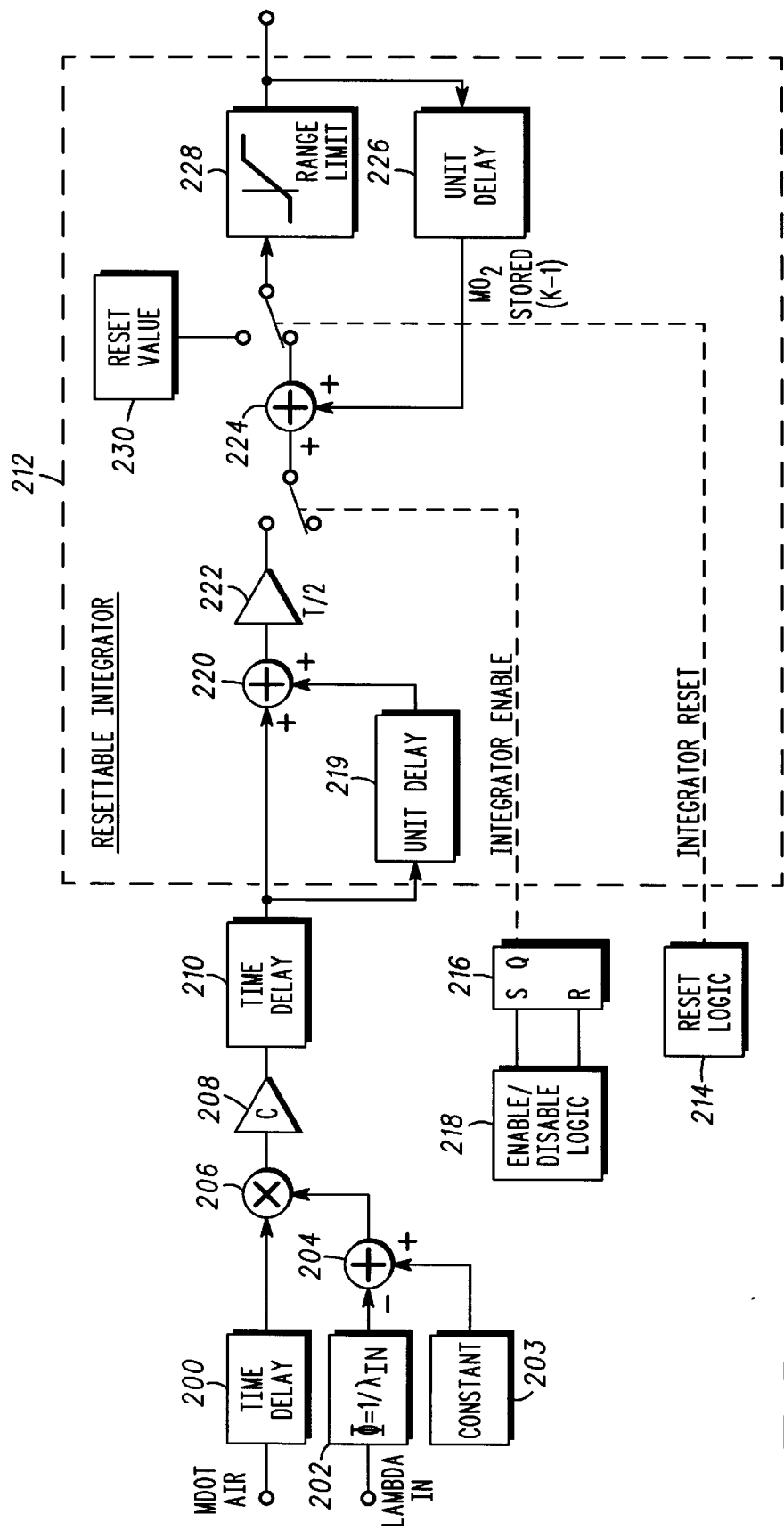
FIG. 10 is a signal processing schematic diagram in accordance with an exemplary embodiment of the invention for numerical integration of oxygen flow.
Figure 11:
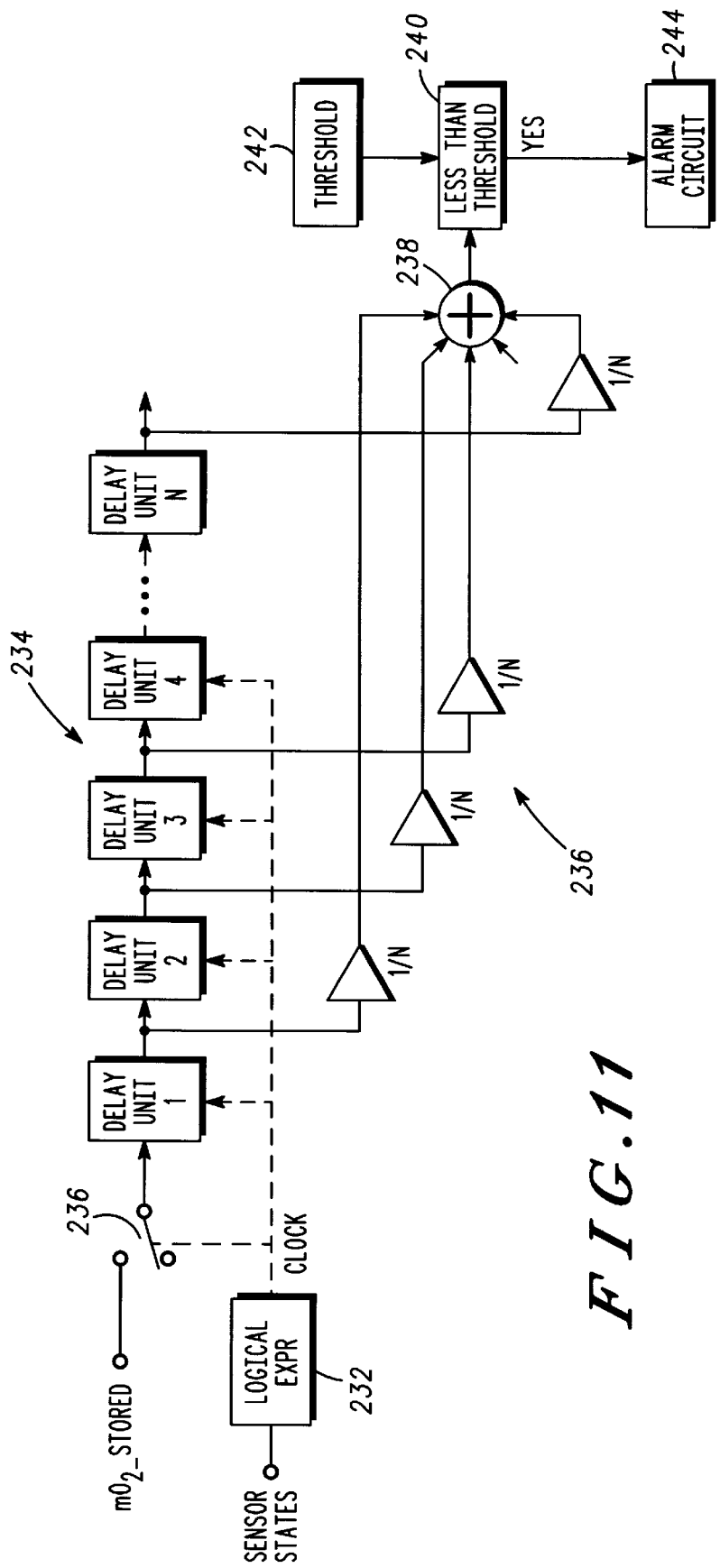
FIG. 11 is a signal processing schematic diagram in accordance with an exemplary embodiment of the invention for the computation of oxygen storage capacity.

Those skilled in the art will recognize that the foregoing method can be implemented in a variety of circuit arrangements for processing information obtained by the various sensor outputs. FIGS. 9–11 illustrate one embodiment of a signal processing arrangement for monitoring the performance of a catalytic converter in accordance with the invention. The signal processing arrangement can be carried out, for example, in engine control unit 10 (shown in FIG. 1).

FIG. 9 illustrates an exemplary embodiment of a signal processing schematic for the determination of sensor states from the output of upstream and downstream sensors 28 and 30. The signal processing for determination of sensor states is generally performed by an input sensor logic unit 180 and an output sensor logic unit 182. The signal processing shown in input and output units 180 and 182 is performed for each iteration (k), where input signals are sought from upstream and downstream sensors 28 and 30. For the determination of sensor states, input and output units define a rich condition as a logic "1" and a lean condition as a logic "0." Also, the rich or lean breakthrough conditions shown in Table I of the APPENDIX can be determined by the signal processing shown in FIG. 9.

Signals from upstream gas sensor 28 are received by comparator 184 and 186 in input unit 180. Comparator 184 compares the $\lambda_{inlet}$ value with a predetermined threshold from memory location 185, and comparator 186 compares the $\lambda_{inlet}$ value with a predetermined threshold from memory location 188. If $\lambda_{inlet}$ is less than the threshold value, comparator 184 sets the value of variable u1 to a logic "1" at data path switch 190. Otherwise, u1 is set to a logic "0." Correspondingly, if the $\lambda_{inlet}$ value is greater than the threshold value from memory 188, comparator 186 sets the value of u1 to a logic "0" at data path switch 192.

Data path switch 190 outputs either the variable connected to input u2 or the variable connected to input u3 depending upon whether u1 is a logic "1" or logic "0." If u1 is a logic "1," indicating a rich condition, data path switch 190 outputs u2 (always a logic "1" from memory 194). Whereas, if u1 is a logic "0," indicating a lean condition, data path switch 190 outputs u3.

Data path switch 192 outputs the value of the variable at input u2 (always a logic "0") or the variable at input u3 to data path switch 190, depending upon the logic value of variable u1 received from comparator 186. The variable u2 is always set to a logic "0" in data path switch 192 by memory 196, while the input variable u3 of switch 192 is connected to the output of a unit delay 198. This signal is the previous output of data path switch 190. If u1 is set to logic "0" by comparator 186, indicating a lean condition, data path switch 192 outputs a logic "0" to data path switch 190 (received as input u3).

In a case where the $\lambda_{inlet}$ value is neither rich nor lean, as determined by comparitors 184 and 186, the default value for input u3 to data path switch 190 is the previous output of data path switch 190. The output signal from data path switch 190 enters a unit delay 198, and the signal is then relayed to data path switch 192. In this manner the value for u3 in data path switch 192 always represents the rich or lean state for the previous iteration (k-1).

Output unit 182 performs signal process from downstream sensor 30. The signal processing performed by output unit 182 is analogous to that performed by input unit 180. Accordingly, corresponding signal processing devices within output unit 182 have been designated by the same element number as those within input unit 180 followed by the apostrophe symbol.

Shown in FIG. 10 is an exemplary embodiment of a signal processing schematic for the computation of oxygen stored by the catalyst. The value computed by the signal processing arrangement corresponds to $\overline{m}_{O_2}$ provided by equations (4) and (5). Time delay 200 applies a delay to compensate for the exhaust gas air mass pumping delay caused by the operation of engine 16 (shown in FIG. 1). Block 202 receives $\lambda_{inlet}$ values and computes $\Phi_{inlet}$. Adder 204 receives a constant from memory 203 and the output of block 202 and computes the term $(1-\Phi_{inlet})$. At multiplier 206, the output of adder 204 is multiplied by the air flow rate output by time delay 200. Then, a gain is applied in proportion to the mass fraction of oxygen in air by gain circuit 208, which outputs to a time delay 210. The transport delay arising from exhaust gas propagation over a distance within exhaust system 32 is compensated by time delay circuit 210.

The output of time delay circuit 210 is received by integrator 212. Integrator 212 also received a reset command from reset logic circuit 214 and an integrator enable signal from set/reset latch 216. Set/reset latch 216 receives logic signals for "set" and "reset" commands from logic unit 218. These commands correspond to the information contained in Table I of the APPENDIX in the column labeled "Integrator Status."

Integrator 212 accumulates mass flow of oxygen information over a predetermined time interval specified by the integrator enable and reset signals. As previously described the time intervals are determine by selected integration limits, designed as (a) and (b) in equation (4). During the time interval integrator 212 sums the mass of oxygen accumulating on the catalyst within catalytic converter 34 for each discrete iteration (k). Integrator 212 receives the output of time delay circuit 210 and adder 220 sums the output of the present iteration (k) with the previous iteration (k-1) stored in memory 219. A gain equal to half of the time interval T is applied to the output of adder 220 by gain circuit 222.

When integrator 212 is enabled, an adder 224 adds stored oxygen value from the previous iteration from buffer 226 to the output of gain circuit 222. The output of adder 224 is conditioned by a range limiter 228 before a outputting a value for $\overline{m}_{O_2}$. When integrator 212 is to be reset, a reset value of 0 is input from block 230 upon receiving a reset command from logic circuit 214.

FIG. 11 illustrates a signal processing schematic diagram for computing and recording oxygen storage capacity in accordance with an exemplary embodiment of the invention. A logic circuit 232 receives sensor state information from the output of input unit 180 and output unit 182 (shown in FIG. 9). Depending upon the detection of breakthrough, logic circuit 232 activates a selected one of the storage buffers in storage array 234 and accesses oxygen storage information through switch 236. Values from each storage buffer are divided by a predetermined number of values N (equal to the number of buffers) by gain circuits 236 and the mean value is output from an adder 238.

The mean value is compared with a threshold value by comparator 240. The threshold value stored at memory 242 provides pass/fail criteria for the amount of oxygen stored by the catalyst. If the stored oxygen value computed by adder 238 is less than the threshold value, a signal alert is output to alarm circuit 244. The alarm circuit notifies the operator that catalyst maintenance is necessary.

Thus it is apparent that there has been provided, in accordance with the invention, a method of monitoring the performance of a catalytic converter which fully meets the advantages set forth above. Although the invention has been described and illustrated with reference to specific illustrative embodiments thereof, it is not intended that the invention be limited to those illustrative embodiments. Those skilled in the art will appreciate that a wide variety of monitoring and control schemes can benefit from the oxygen storage and release information provided by the present invention. Accordingly, all such uses of the information generated by the computational scheme described above is contemplated by the present invention. In addition to table look-up control methods, the information provided by the present invention can also be employed in real-time control methods for determining catalyst performance. Furthermore, those skilled in the art will recognize that variations and modifications can be made without departing from the spirit of the invention. For example, different circuit arrangements are possible for carrying out the method of the invention. It is therefore intended to include within the invention all such variations and modifications as fall within the scope of the appended claims and equivalents thereof.

We claim:

1. A method for monitoring the performance of a catalytic converter comprising the steps of:

providing a value for a mass flow rate selected from one of a mass flow rate of air and a mass flow rate of fuel in an exhaust gas stream entering the catalytic converter;

providing a value for a first normalized air-fuel ratio;

calculating an amount of oxygen stored in the catalytic converter using one of the mass flow rate of air and the mass flow rate of fuel together with the first normalized air-fuel ratio, wherein a numerical integration is performed using integration limits determined from dynamic voltage signals, and wherein a pumping delay from an engine and a transport delay within an exhaust system coupling the engine to the catalytic converter is used in determining the amount of oxygen stored in the catalytic converter; and comparing the amount of oxygen stored in the catalytic converter with pass-fail criteria to determine the performance of the catalytic converter.

2. The method of claim 1, wherein the step of providing a value for a first normalized air-fuel ratio comprises the step of monitoring a first normalized air-fuel ratio of an exhaust gas, stream entering the catalytic converter.

3. The method of claim 2, wherein the step of calculating an amount of oxygen comprises the steps of:

monitoring a normalized second air-fuel ratio of the exhaust gas stream exiting the catalytic converter;

defining a start time by monitoring the second normalized air-fuel ratio to determine when the second normalized ratio becomes greater than one;

defining a stop time by monitoring the second normalized air-fuel ratio to determine when the second normalized ratio becomes less than one and; and calculating a time integral of a mathematical expression selected from the group consisting of $C\dot{m}(\lambda-1)/\lambda$ and $C\dot{m}'(\lambda-1)$, from using the start time and the stop time as limits of integration, where C is a constant representing the approximate mass fraction of oxygen in air, $\dot{m}$ is a mass flow rate of air in the exhaust gas stream, $\dot{m}'$ is a fuel mass flow rate in the exhaust gas stream, and $\lambda$ is the first normalized air-fuel ratio.

4. The method of claim 3, wherein the step of providing a value for a mass flow of air comprises the steps of:

providing an internal combustion engine having an intake manifold; and providing an air mass flow sensor in the intake manifold.

5. The method of claim 3, wherein the step of providing a value for a mass flow of fuel comprises the steps of:

providing an internal combustion engine having a plurality of cylinders and a plurality of fuel injectors, each injector coupled to a selected one of the plurality of cylinders;

calculating a value for the mass flow rate of fuel according the following equation:

$\dot{m}'$=(injector pulse width)(injector flow specification)(number of cylinders)(RPM/2)k, where is k a constant.

6. The method of claim 2, wherein the step of monitoring a first air-fuel ratio comprises monitoring a linear voltage output of an exhaust-gas-oxygen sensor and wherein the step of monitoring a second air-fuel ratio comprises monitoring a non-linear voltage output of an exhaust-gas-oxygen sensor.

7. A method for monitoring the performance of a catalytic converter comprising the steps of:

providing a first gas sensor in an exhaust gas stream at a location upstream from the catalytic converter and a second gas sensor in the exhaust gas stream at a location downstream from the catalytic converter;

monitoring the dynamic voltage output of the second gas sensor to detect a lean breakthrough to define a first integration limit;

monitoring the dynamic voltage output of the second gas sensor to detect a rich breakthrough to define a second integration limit, wherein the dynamic voltage output can change from rich to lean and from lean to rich over a short time interval without defining a first or second integration limit;

providing normalized air-fuel ratio for the exhaust gas stream;

determining an amount of oxygen stored in the catalytic converter by integrating a mathematical expression selected from the group consisting of $C\dot{m}(\lambda-1)/\lambda$ and $C\dot{m}'(\lambda-1)$, from the first integration limit to the second integration limit, where C is a constant representing an approximate mass fraction of oxygen in air, $\dot{m}$ is an air mass flow rate in the exhaust gas stream, $\dot{m}'$ is a fuel mass flow rate in the exhaust gas stream, and $\lambda$ is the normalized air-fuel ratio; and providing pass/fail criteria and comparing the amount of oxygen stored in the catalytic converter with the pass/fail criteria to determine the performance of the catalytic converter.

8. The method of claim 7, wherein the step of monitoring the voltage output of the second gas sensor to detect a lean breakthrough comprises the steps of:

calculating a downstream normalized air-fuel ratio in the exhaust gas stream exiting the catalytic converter; and comparing the downstream normalized air-fuel ratio with a predetermined threshold, wherein the predetermined threshold has a value greater than unity.

9. The method of claim 7, wherein the step of monitoring the voltage output of the second gas sensor to detect a rich breakthrough comprises the steps of:

calculating a downstream normalized air-fuel ratio in the exhaust gas stream exiting the catalytic converter; and comparing the downstream normalized air-fuel ratio with a predetermined threshold, wherein the predetermined threshold has a value less than unity.

10. The method of claim 7, wherein the step of providing a first gas sensor comprises providing a universal-exhaust-gas-oxygen (UEGO) sensor, and wherein the step of providing a second gas sensor comprises providing a heated-exhaust-gas-oxygen (HEGO) sensor.

11. A method for monitoring the performance of a catalytic converter comprising the steps of:

receiving information from a plurality of sensors, wherein the information includes a mass flow rate of air flowing into an engine and an excess air ratio in an exhaust gas stream flowing into and out of the catalytic converter;

calculating the mass flow rate of oxygen into the catalytic converter;

integrating the mass flow rate of oxygen from a first integration limit to a second integration limit by integrating a mathematical expression including the term $(\lambda-1)/\lambda$ to determine the amount of oxygen stored by a catalyst within the catalytic converter and the amount of oxygen released by the catalyst, where $\lambda$ is an excess air/fuel ratio, and wherein the information includes dynamic sensor data and the integration limits are determined from the dynamic sensor data; and comparing the amount of oxygen stored and released with threshold values to determine a pass/fail condition; and alerting an operator for a fail condition.

12. The method of claim 11, wherein the step of receiving information comprises providing a first gas sensor in an exhaust gas stream at a location upstream from the catalytic converter and a second gas sensor in the exhaust gas stream at a location downstream from the catalytic converter.

13. The method of claim 12, wherein the step of integrating comprises:

monitoring the voltage output of the second gas sensor to detect a lean breakthrough to define the first integration limit; and monitoring the voltage output of the second gas sensor to detect a rich breakthrough to define the second integration limit.

14. The method of claim 11 further comprising;

computing a pumping delay from the engine;

computing a transport delay within an exhaust system coupling the engine to the catalytic converter;

adjusting the mass flow rate of oxygen into the catalytic converter by the pumping delay; and adjusting the excess air ratio in the exhaust gas stream flowing into the catalytic converter by the transport delay.

15. A method for monitoring the performance of a catalytic converter comprising the steps of:

analyzing the voltage signals from a first gas sensor positioned in an exhaust system at a location upstream from the catalytic converter to determine a rich or a lean state;

analyzing the voltage signals from a second gas sensor positioned in the exhaust system at a location downstream from the catalytic converter to determine a rich or a lean state;

continuously calculating the mass flow rate of oxygen flowing into the catalytic converter, using a numerical integration algorithm in which first and second integration limits are determined by dynamic voltage signal analysis, and using a mathematical expression including the term $(\lambda-1)/\lambda$, where $\lambda$ is an excess air/fuel ratio;

enabling an integrator to sum iteration values of the mass flow rate of oxygen over a predetermined time interval;

receiving state information from the first and second gas sensors and storing sums calculated by the integrator into discrete storage locations;

summing average values from each storage location and calculating a mean amount of stored oxygen; and comparing the mean amount of stored oxygen with a threshold level and activating an alarm circuit when the total amount of stored oxygen is less than the threshold level.

* * * * *